US00RE38235E

(19) United States
(12) Reissued Patent
Kobayashi et al.

(10) Patent Number: US RE38,235 E
(45) Date of Reissued Patent: Aug. 26, 2003

(54) SCANNING RECORDING TYPE PRINTING METHOD AND APPARATUS FOR INCREASING IMAGE QUALITY BY CONTROLLING TONE DOT LOCATIONS WITHIN IMAGE PIXELS

(75) Inventors: Shinya Kobayashi, Mito (JP); Masayasu Anzai, Hitachi (JP)

(73) Assignee: Hitachi, Ltd., Tokyo (JP)

(21) Appl. No.: 08/787,569

(22) Filed: Jan. 22, 1997

Related U.S. Patent Documents

Reissue of:

(64) Patent No.: 4,926,248
Issued: May 15, 1990
Appl. No.: 07/235,096
Filed: Aug. 23, 1988

(63) Continuation of application No. 06/845,343, filed on Mar. 28, 1986, now abandoned.

(30) Foreign Application Priority Data

Mar. 30, 1985 (JP) ..... 60-64966
Aug. 23, 1985 (JP) ..... 60-184274

(51) Int. Cl.[7] ..... H04N 1/40; H04N 1/46

(52) U.S. Cl. ..... 358/501; 358/298; 358/456; 358/459

(58) Field of Search ..... 358/505, 501, 358/298, 456, 459; H04N 1/40, 1/46

(56) References Cited

U.S. PATENT DOCUMENTS

| | | | | |
|---|---|---|---|---|
| 3,230,303 A | 1/1966 | Macovski et al. | ..... | 358/283 |
| 3,916,096 A | 10/1975 | Everett et al. | ..... | 358/283 |
| 4,040,094 A | 8/1977 | Everett et al. | ..... | 358/283 |

(List continued on next page.)

FOREIGN PATENT DOCUMENTS

| | | |
|---|---|---|
| DE | 3338722 | 5/1984 |
| GB | 2102240 | 1/1983 |
| JP | 4923645 | 3/1974 |
| JP | 5255642 | 5/1977 |
| JP | 54144201 | 1/1979 |
| JP | 5416697 | 6/1979 |
| JP | 5717265 | 1/1982 |
| JP | 5757679 | 4/1982 |
| JP | 5764565 | 4/1982 |
| JP | 5799866 | 6/1982 |
| JP | 5814669 | 1/1983 |
| JP | 5856572 | 4/1983 |
| JP | 60145769 | 8/1985 |
| JP | 60174651 | 9/1985 |

OTHER PUBLICATIONS

"Digital Color Printer" Patent Abstracts of Japan, vol. 6, No. 142 (m–146) [1020], Jul. 31, 1982, Abstract for Japanese Kokai 57–64565.

Sayanagi, Title Unknown, Denshi–Shashin Gakkaishi (Journal of the Electro–Graphic Society), 23, No. 3, (1984), pp. 16–23 (In Japanese).

Motorola, Inc., Schottky TTL Data, Series D 3rd Printing 1983.

The TTL Data Book for Design Engineers, 2nd Edition Texas Instruments, Inc. 1976.

Micro–Electronics, Digital and Analog Circuits and Systems by Jacob Millman.

English Translation of p. 196, paragraph 4.3.3 and last page of "Print Technology Generalities", 2nd Edition, 24th Issue 1981.

(List continued on next page.)

*Primary Examiner*—Howard Britton
(74) *Attorney, Agent, or Firm*—Antonelli, Terry, Stout & Kraus, LLP

(57) ABSTRACT

A scanning recording type printing method, in which sampled image of tone data is printed by controlling the scanning length and position of a dot which may include a plurality of different colors in the interior of a pixel such that the dots in two adjacent pixels are paired such that no interruptions exist between the dots.

40 Claims, 11 Drawing Sheets

U.S. PATENT DOCUMENTS

| | | | | |
|---|---|---|---|---|
| 4,149,183 | A | 4/1979 | Pellar et al. | 358/283 |
| 4,384,297 | A | 5/1983 | Ohara et al. | 358/298 |
| 4,486,788 | A | 12/1984 | Yamada | 358/298 |
| 4,496,989 | A | 1/1985 | Hirosawa | 358/75 |
| 4,498,108 | A | 2/1985 | Lindemann et al. | 358/298 |
| 4,499,489 | A | 2/1985 | Gall et al. | 358/536 |
| 4,507,685 | A | 3/1985 | Kawamura | 358/283 |
| 4,595,948 | A | 6/1986 | Itoh et al. | 358/75 |
| 4,626,901 | A | 12/1986 | Tanioka | 358/298 |
| 4,680,625 | A | 7/1987 | Shoji et al. | 358/80 |
| 4,680,646 | A | 7/1987 | Ikeda et al. | 358/298 |
| 4,683,492 | A | 7/1987 | Sugiura et al. | 358/80 |
| 4,800,442 | A | 1/1989 | Riseman et al. | 358/459 |

OTHER PUBLICATIONS

The New IEEE Standard Dictionary of Electrical and Electronics Terms (including Abstracts of all Current IEEE Standards), 1992.

1985 Databook Electronic Information Series, Digital Integrated Circuit, Edition 19, vol. 30, Book 27, 9/85.

1985 Databook Electronic Information Series, Digital Integrated Circuits Edition 18, vol. 30, Book 6, 3/85.

Issue No. 1—Allegation by Third Party that claim 5 employs toner not ink.

Issue No. 2—Allegation by Third Party that new matter was added to specification.

Issue No. 3—Allegation by Third Party that Applicant is attempting to advance without notice to Examiner of a completely contrary claim interpretation.

| LINE NUMBER | | | | | |
|---|---|---|---|---|---|
| 1 | 1A | 2B | 3A | 4B | 2A |
| 2 | 2D | 3C | 4D | 3C | 2D |
| 3 | 2A | 1B | 0A | 1B | 0A |
| 4 | 2D | 3C | 2D | 1C | 2D |
| 5 | 3A | 2B | 1A | 0B | 1A |
| 6 | 1D | 2C | 1D | 1C | 2D |

FIG. 13
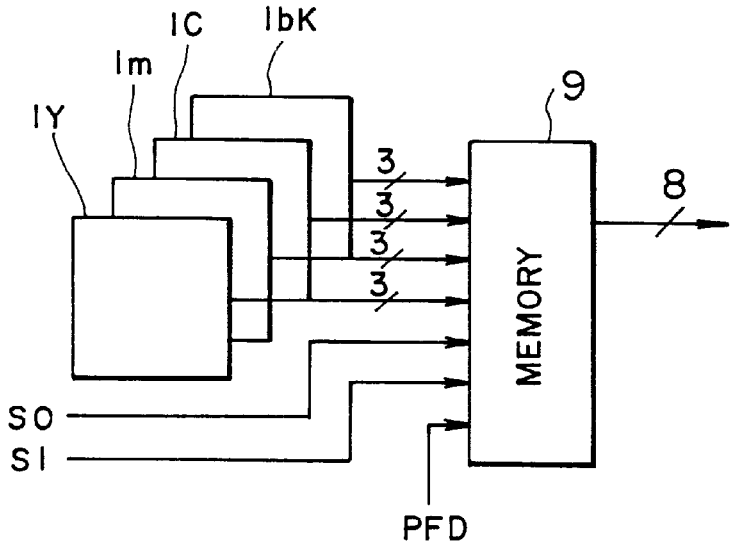
FIG. 14B
FIG. 14A
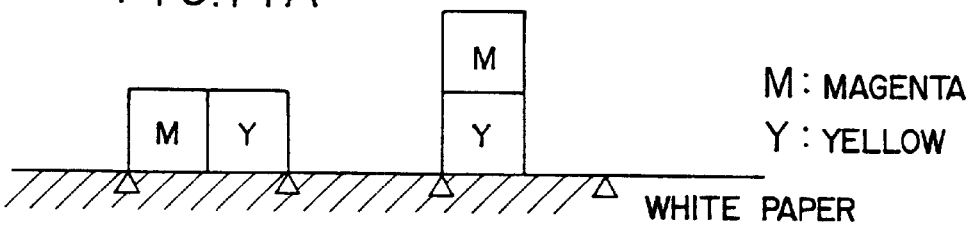

SCANNING RECORDING TYPE PRINTING METHOD AND APPARATUS FOR INCREASING IMAGE QUALITY BY CONTROLLING TONE DOT LOCATIONS WITHIN IMAGE PIXELS

Matter enclosed in heavy brackets [ ] appears in the original patent but forms no part of this reissue specification; matter printed in italics indicates the additions made by reissue.

This application *is a reissue of U.S. Pat. No. 4,926,248, issued May 15, 1990 which* is a continuation of application Ser. No. 845,343, filed Mar. 28, 1986, now abandoned.

BACKGROUND OF THE INVENTION

This invention relates to a monochrome or color printing method and an apparatus for realizing the same and in particular to a scanning recording type printing method and an apparatus for improving the image quality in a high precision fine image recording apparatus.

As a method for varying the recording area of each pixel in order to express light and shade of the image in a scanning recording type printing apparatus, there is known a method, by which image recording pulse signals are modulated in pulse width by means of data representing the tone. Apparatuses described in Japanese Patent Application un-examined publications (Kokais) Nos. 82-57679 and 82-99866 are examples of this type of system.

In such a printing recording apparatus it is necessary to reduce each cell in size and increase the pixel density in order to be able to record an image with high precision and high fineness. The scanning direction and the size of each pixel in the scanning recording are determined by the scanning speed and the production period of the image recording pulse signal. Consequently, in order to make each pixel smaller, the production period of the image recording pulse signal must be shortened and the rate of the intermission must be increased. However, when the rate of the intermission of the image recording pulse signal is increased, the image quality has a tendency to be lowered.

The reason will be explained as follows taking an electrographic laser beam printer as an example.

In FIG. 2, a memory device 1 stores tone data of each of the pixels in image signals coming from an image read-out device or a computer (not shown in the figure) for one scanning line. The tone data are sent to a latch 2 in the form of pixel tone data DA for every pixel, depending on the position of recording scanning by a pixel clock signal PCLK1 given by a timing treatment circuit 4, which will be described later. Supposing that the pixel tone is represented by 16 degrees from "0" (white) to "15" (black), the pixel tone data DA are 4 bit data. In a pixel recording pulse signal generation circuit 9 the latch 2 holds (latches) the pixel tone data DA by a pixel clock signal PCLK2 given by the timing treatment circuit 4 and its holding period of time is equal to a period of time during which one pixel domain is scanned for recording. These pixel tone data DA held by the latch 2 are given to a comparator 5. A counter 3 which is a cyclic 4 bit binary counter, counts clock signals CLK1 coming from a clock generator 10 under the control by a recording scanning signal LINE1 from the timing treatment circuit 4. 16 clock signals CLK1 are outputted for a period of time during which one pixel domain is scanned for recording. The counter 3 counts up from "0" (white) to "15" (black) and gives the content of the count as comparison data DB to the comparator 5. At the same time it gives a carry signal as pixel clock signal PCLK3 to the timing treatment circuit 4. The timing treatment circuit 4 generates the pixel clock signals PCLK1 and PCLK2, referring to the pixel clock signal PCLK3 and at the same time uses a detection signal LINE2 coming from a laser beam detector 8 as a recording scanning start synchronization signal for every scanning line.

The comparator 5 compares the pixel tone data DA with the comparison data DB and generates a 2-value pixel recording pulse signal S, corresponding to "black", if DA>DB "white", if DA≦DB, which is given to a semiconductor laser circuit 6. A laser beam outputted by the semiconductor laser circuit 6 is deflected in a region of an angle θ so as to scan and illuminate an electro-graphic photo-sensitive drum 7. In this way an electro-static latent image is formed thereon and transferred to a recording paper, after having being developed with toner. After that, it is further fixed so as to be a record.

FIGS. 1(A) to 1(C) indicate a timing chart representing the working mode of the pixel recording pulse signal and the pixel recording in such a laser beam printer. (A) indicates the pixel number and the pixel tone data DA. The abscissa t in (B) represents the time, in which T denotes the period of time necessary for scanning to record one pixel. The ordinate represents digital values corresponding to pixel tones, in which "0" indicates "white"; "15" indicates "black"; DA shows the pixel tone data; and DB shows the comparison data. The abscissa x in (C) represents the position of the recording scanning of the laser beam and the hatched regions show the recorded area for each of the pixels.

In such a recording method, since the laser beam outputted by the semiconductor laser circuit 6 has a certain spread in the scanning direction, when this laser beam is interrupted by the pixel recording pulse signal S in the course of the scanning, the light quantity at both the border portions of the recorded dots in the main scanning direction on the pixel recording surface is inconveniently in an intermediate region between white and black and thus the tone of the record at these portions is unstable, which is a factor lowering the image quality. This is produced by the fact that the laser beam has a certain spread. Consequently, when, in order to record a finer image with a high precision, pixels are made smaller and the number of interruptions of the laser beam is increased, the proportion of such unstable regions increases, which decreases the image quality.

Such phenomena are not limited to the laser beam printer, but is produced in photo-sensitive recording apparatuses, in which recording energy given to a recording medium is interrupted and controlled in the course of scanning, stylus electro-static recording apparatuses, and scanning recording type recording apparatuses such as scanning illumination type electrographic printers using liquid crystal light switches and light emitting diodes.

In addition, in color printing by off-set printing, it is difficult to position dots to be printed with a high precision. For example, in the case of a multi-color printing with 4 colors of cyan, yellow, magenta and India ink, when it is tried to superpose corresponding dots of different colors on each other, slight misalignment produces Moire fringes (interference fringes). Therefore, in practice, the screen angles of dots of different colors are intentionally varied appreciably so that the dots of different colors are superposed at random, in order to prevent the production of low frequency moire fringes. However, by this method, superposition of dots of different colors is irregular, which prevents the effect of theoretical color correction.

In contrast, in a digital printer such as a laser beam printer, etc., since it is possible to position dots fairly precisely when it is tried to superpose corresponding dots of different colors on each other, there are produced no Moire fringes.

An article by SAYANAGI published in Denshi-Shashin Gakkaishi (Journal of the Electro-Graphic Society) 23, No. 3 (1984) (in Japanese) has disclosed a "concentric solution model", by which the dots are printed by a digital printer so that their centers are superposed on each other (cf. FIG. 3(A)) and reported that 100% under color removal (UCR) is possible by this method (cf. FIG. 3(B)). If this concentric solution model could be realized ideally, a perfect UCR (100% UCR) and other various color correction theories would be efficacious. However, this concentric solution model has not taken the following points into consideration.

(1) Although the dots formed by printing are, in general ideally printed at the central portion, they are not precisely printed at the peripheral portion because of scattering of ink or unevenness of printing. According to the concentric solution model since the net points other than the dot of the ink, which is at the top, exhibit their color by their peripheral portion, it is difficult to reproduce the precise color.

(2) When the UCR is effected according to the concentric solution model, since a color dot by an Indian ink color is at the top, other inks printed under the black dot come to nothing and in addition, the dot is apt to be transferred inperfectly because of the superposition of useless inks.

(3) Even by a digital printer, the net points of different colors deviate more or less from each other because of expansion or contraction of the paper, etc. The concentric solution model is poor at this position divergence and the risk that Moire fringes are produced is high.

SUMMARY OF THE INVENTION

The object of this invention is to provide a scanning recording type printing method and an apparatus for increasing the image quality in a high precision fine image recording by controlling the location of dots of at least one color printed within a pixel.

According to this invention, in a scanning recording type print recording apparatus, in which tone data of each of the pixels in the image signal are transformed into an image recording pulse signal having a time width proportional to the tone for each of the pixels and production of recording energy is controlled so as to be interrupted by this image recording pulse signal, decreases in the image quality are reduced by reducing the proportion of the area of unstable regions. That is, this invention is characterized in that, by producing the rear end of the recording pulse signal of the preceding recording side pixel in a pair of pixels adjacent to an arbitrarily selected pixel in the recording scanning direction in accordance with the rear end of the relevant pixel and the front end of the recording pulse signal of the succeeding recording side pixel in accordance with the front end of the relevant pixel, so that the production of the recording energy between this pair of pixels is continuous and by making the region where the recording tone is unstable, smaller, decreases in the image quality are reduced.

The "pixel" is the smallest unit of spatial resolving power, when an original analogue image is quantized (digitalized) and in general it is defined so as to be sufficiently small. In a digital printer, however, many dots are formed in this pixel and wherever the dots are written in this pixel the differences therebetween cannot be recognized by the human eye. In other words, within a pixel, wherever the dots are moved, the movement itself doesn't lower the resolving power. For example, in the case where a pixel is large, the Bayer method is adopted, by which one pixel is represented by many small dots, or a dot is formed at a position deviated from the center of the pixel in order to have a screen angle. Also according to this invention attention is paid to this point and in full color printing by multi-color printing, the dots of each of the colors formed within one pixel are not concentrated to one point, which is the center of the pixel, in contrast to those in the concentric solution model, but are instead suitably arranged within the pixel for every color. In this way superposition of the dots of different colors can be controlled and as a result a high quality full color printing can be effected.

That is, this invention is characterized in that, when an intermediate chrominance a color which is not represented by one of the inks used in the system is printed by effecting area-modulation depending on a plurality of colored inks within a pixel, an area-modulation is effected by arranging a first colored ink of at least one color at a first position within the pertinent pixel and another area-modulation is effected by arranging a second colored ink of at least one color, which is different from the first colored ink, at a second position within the pertinent pixel, which is different from the first position.

In a preferred embodiment according to this invention, the first colored ink mentioned above is arranged from a first end within the pixel towards the center of the pixel and the second colored ink mentioned above is arranged from a second end within the pixel towards the center of the pixel.

In another preferred embodiment according to this invention, the first and second ends are in the main scanning direction within the pixel.

In still another preferred embodiment according to this invention, the first colored ink stated above is constituted by a multi-layer structure consisting of yellow ink, magenta ink and cyan ink and the second colored ink stated above is constituted by black ink.

In still another preferred embodiment according to this invention, in an arbitrarily selected pixel the first colored ink mentioned above is arranged from a first end within the pixel towards the center of the pixel and the second colored ink mentioned above is arranged from a second end within the pixel towards the center of the pixel, and further, in pixels adjacent to the arbitrarily selected pixel mentioned above, the first colored ink is arranged from the second end within the pixel towards the center of the pixel and the second colored ink is arranged from the first end within the pixel towards the center of the pixel.

BRIEF DESCRIPTION OF THE DRAWINGS

FIG. 13 is a block diagram indicating the construction of a circuit, which is still another embodiment of this invention; and FIG. 14 is a scheme for explaining the principle of the circuit indicated in FIG. 13.

DESCRIPTION OF THE PREFERRED EMBODIMENTS

Figure 1:
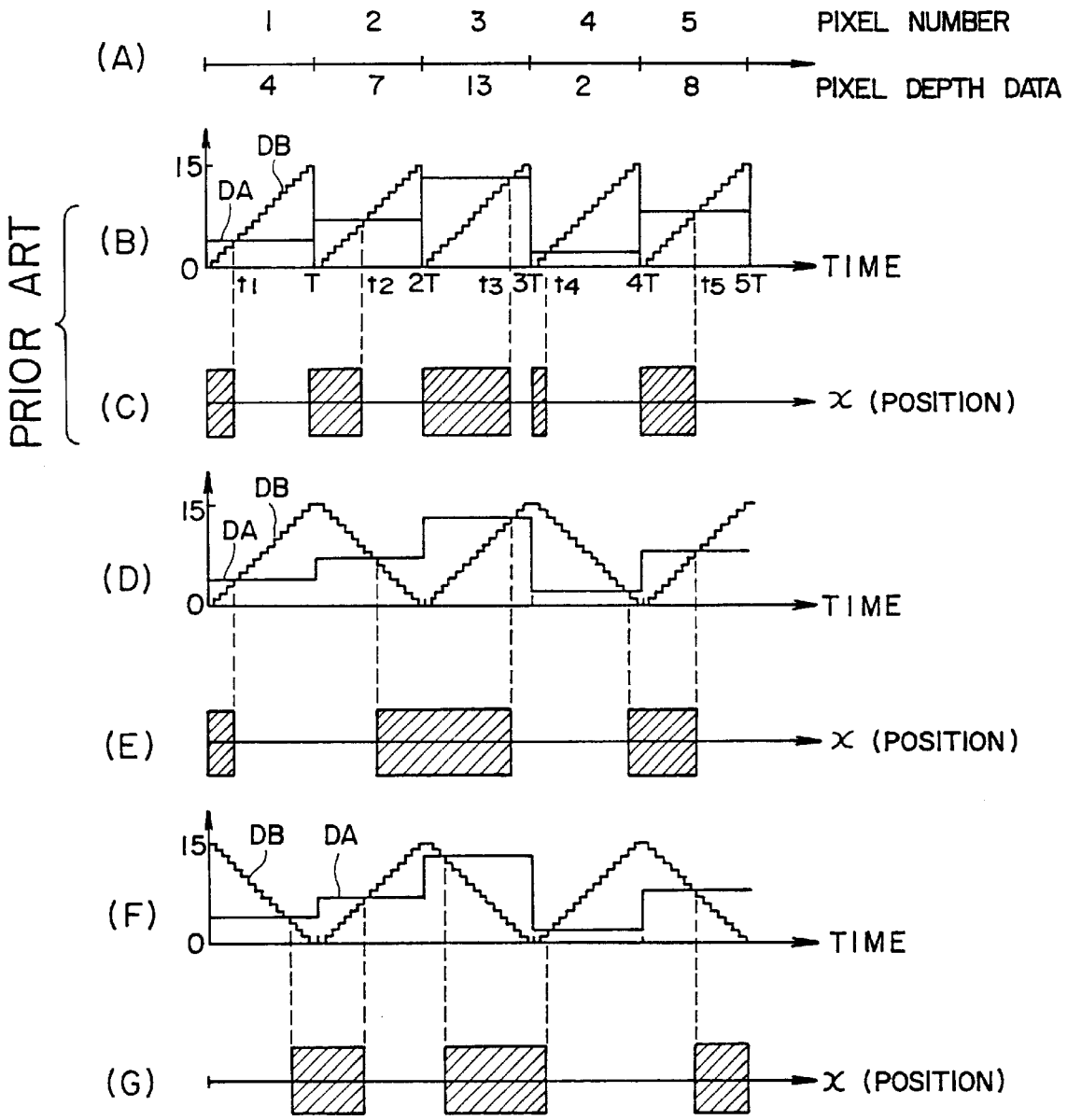
FIGS. 1(A)–(G) represent a timing chart for explaining the working mode; (A) indicating pixel numbers and pixel tone data; (B) and (C) the working mode for production of the pixel recording pulse signal and the pixel recording pattern according to prior art techniques; (D)–(G) the working mode for production of the pixel recording pulse signal and the pixel recording pattern by the method according to this invention

FIGS. 1(D), (E), (F), and (G) are timing charts illustrating the working mode of the production of the pixel recording pulse signal and the pixel recording according to this invention.

(D) shows the working mode of the production of the pixel recording pulse signal using the comparison between pixel tone data DA and comparison data DB, in which the magnitude of the comparison data DB varies so that it increases in the odd pixel number regions and decreases in the even pixel number regions. In this way, the position of production of the pixel recording pulse signal S generated by comparing the pixel depth data DA with the comparison data DB is so determined that in the odd pixel number regions the front or first end of the pixel recording pulse signal is in accordance with the front or first end of the pertinent pixel and in the even pixel number regions the rear or second end of the pixel recording pulse signal S is in accordance with the rear or second end of the pertinent pixel, i.e. the rear or second end of the recorded dot in the main scanning direction and thus, in the example indicated in the figure, the pixels No. 2 and No. 3, and No. 4 and No. 5 become continuous. Consequently, in the recording pixels recorded on the basis of this pixel recording pulse signal, as indicated in (B), the pixels No. 2 and No. 3, and No. 4 and No. 5 are continuous, respectively, and thus, there are no border portions in the scanning direction between the pixels belonging to each of the pairs. Therefore, the unstable region between pixels is omitted in some instances.

(F) shows an example, where the magnitude of the comparison data DB decreases in the odd pixel number regions and increases in the even pixel number regions In the recording pixels of this case, as indicated in (G), the pixels No. 1 and No. 2, and No. 3 and No. 4 are continuous.

Now the pixel recording pulse signal production circuit used for such a pixel recording will be explained. The production of the pixel recording pulse signal by the comparison between the pixel tone data DA and the comparison data DB, as previously indicated in FIG. 1(D) can be effected by ameliorating the circuit generating the comparison data DB indicated in FIG. 2. Therefore, here the circuit generating the comparison data DB will be explained and explanation of the other circuits will be omitted, because they are identical to those used in prior art apparatuses. Further, each of output terminals ,of each of the circuits and the signal produced thereat are denoted with the same reference numeral.

Figure 4:
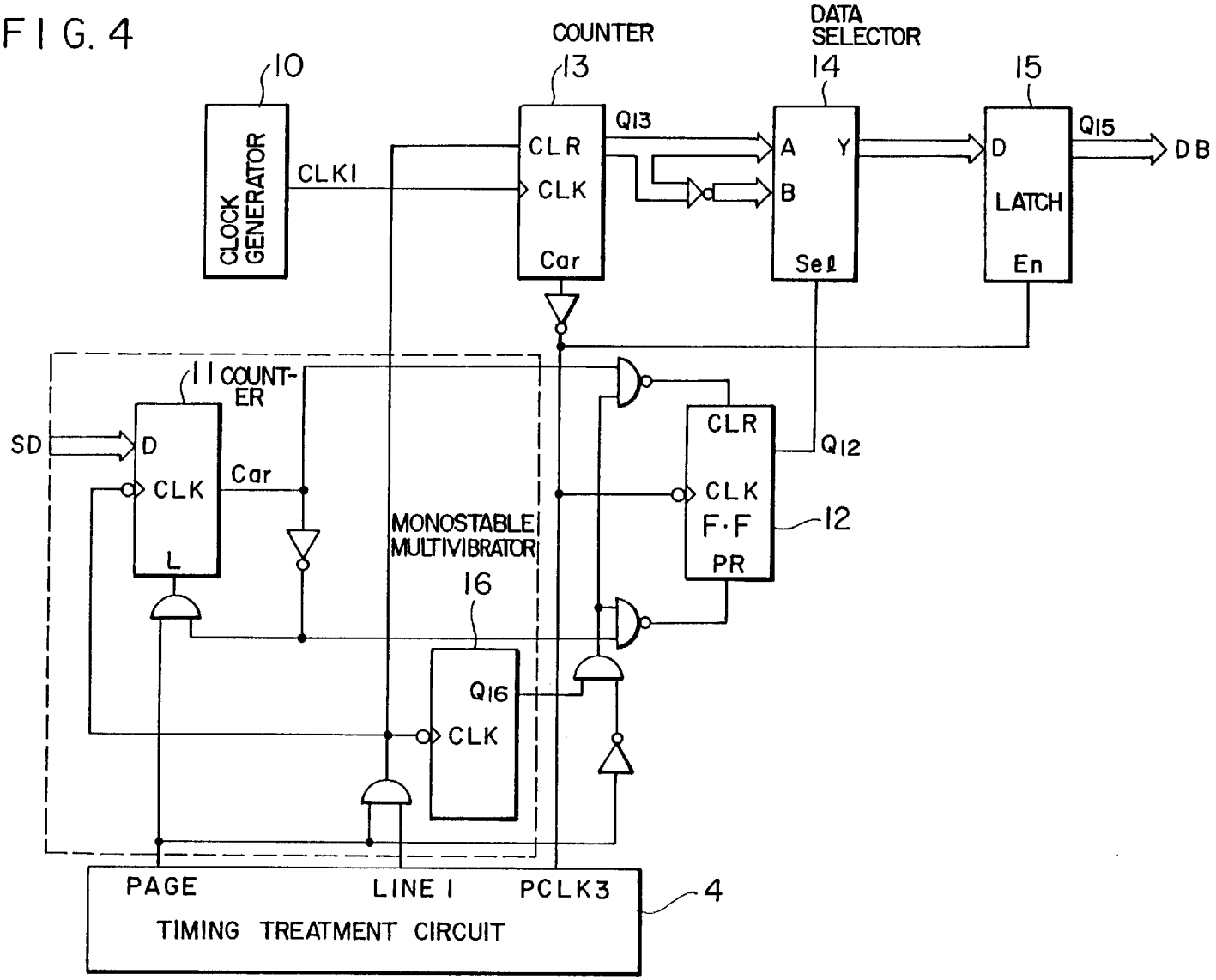
FIG. 4 is a block diagram indicating a comparison data production circuit for realizing this invention.

In FIG. 4, a counter 13 is a hexadecimal counter, which counts clock signals CLK1 inputted from a clock generator 10 to its clock terminal CLK. The recording scanning signal LINE1 outputted by the timing treatment circuit 4 is at the high level during the recording scanning. The counter 13 stated above counts the clock signals CLK1, when this recording scanning signal LINE1 inputted to the clear terminal CLR is at the high level and it is cleared to "0", when the signal LINE1 is at the low level. The output signal $Q_{13}$ of the counter 13 is inputted as it is to an input terminal A of a data selector 14 and the reversed value of the output signal $Q_{13}$ is inputted to another input terminal B thereof. That is, when the output signal $Q_{13}$ of the counter 13, "0" is inputted to the input terminal A and "15" to the input terminal B. This data selector 14 outputs the input signal selectively at one of the input terminals A and B stated above, depending on the signal level inputted to its selection control terminal Se1. To this selection control terminal Se1 is given the output signal $Q_{12}$ of an RS flip-flop (hereinbelow abbreviated to FF) 12. A latch 15 outputs the signal inputted to its input terminal D as it is from its output terminal as the output signal $Q_{15}$ (comparison data DB) and effects data latch, depending on the signal level of the pixel clock signal given to its enable terminal En. Further, the carry signal outputted to the carry terminal Car of the counter 13 stated above is reversed to become the pixel clock signal PCLK3, which is supplied to the timing treatment circuit 4, to the clock terminal CLK of FF 12 and to the enable terminal En of the latch 15.

In the construction of the circuit described above, when the recording scanning signal LINE1 outputted, from the timing treatment circuit 4 is at the high level, the counter 13 counts the clock signals CLK1 given by the clock generator 10 and increases the value of the counting output signal $Q_{13}$. When the value of the counting output signal $Q_{13}$ reaches "15", a carry signal is produced at the carry terminal Car. When the data selector 14 is set at the initial state so that the signal at the input terminal A is selected to be outputted, the comparison data DB, which are the output signal $Q_{15}$ of the latch 15 increases successively from "0" to "15". When the value of the count reaches "15" and a carry signal Car is outputted, the latter is given to the enable terminal En of the latch 15 as the pixel clock signal PCLK3 and the latch 15 stated above latches "15". Since the pixel clock signal PCLK3 is given also to the FF 12, the FF 12 is inverted and the signal level of its output signal $Q_{12}$ is changed. By this change of the signal level of the output signal $Q_{12}$ the data selector 14 selects the signal at the input signal B and outputs a signal at its output terminal Y. Consequently the value at the output terminal Y of the data selector 14 varies from "15" to "0", but since the latch 15 latches "15", the comparison data DB remains to be "15". The above is the signal treatment for the pixel of pixel number 1. When the succeeding clock signal CLK1 is inputted, the content of the counter 13 becomes "0". Consequently the value at the output terminal Y of the data selector 14 becomes "15" and the signal treatment proceeds to the treatment for the pixel of pixel number 2. At the same time the carry signal Car of the counter 13 disappears and therefore the latch 15 outputs the signal at the input terminal D as it is. After that the counter 13 counts the clock signals CLK1 and its content increases. However, since the data selector 14 outputs the value at the terminal B, to which the reversed signal is inputted, the comparison data DB, which is the output signal $Q_{15}$ of the latch 15, decreases successively. When the content of the counter 13 reaches "15" (comparison data DB=0), a carry signal Car is outputted and thus the latch 15, the FF 12 and the data selector 14 are controlled in the same way as stated above. At this time the data selector 14 is so commuted that the signal at the input terminal A is selected and outputted at the output terminal Y.

The comparison data DB repeats its increase and decrease, as indicated in FIG. 1(D), by the fact that such operations are repeated in a period of time, during which the recording scanning signal LINE1 is at the high level.

Such a comparison data production circuit has an advantage that a high speed operation is possible with respect to the case where the counter 13 counts up and down.

Then it is possible to obtain the pixel recording pulse signal for effecting the pixel recording, as indicated in FIG. 1(E), while comparing the magnitude of the comparison data DB thus obtained with that of the pixel tone data DA.

In addition, when the output signal $Q_{12}$ of the FF 12 is initialized so that in the initial state the data selector 14 selects and outputs the signal at the input terminal B, the comparison data DB varies as indicated in FIG. 1(F) and thus the pixel recording pulse signal S, which effects pixel recording, as indicated in FIG. 1(G), can be obtained.

Furthermore, the comparison data production circuit indicated in FIG. 4 is provided further with a counter 11 and a monostable multi-vibrator (hereinbelow abbreviated to MM) 16 (block indicated by a broken line). It is possible to vary the screen angle. When a recording operation begins, the timing treatment circuit 4 outputs a high level signal and when the operation is terminated, a printing signal PAGE is produced. The counter 11 is a 2-bit binary counter, in which, when its counting value reaches "3", the carry signal Car becomes high, and screen angle data SD are loaded, when the printing signal PAGE is low. When the carry signal Car of the counter 11 is low, the FF 12 is preset. As a result, since the data selector 14 selects and outputs the signal at the input A, the initial value of the comparison data DB is "0". To the contrary, when the carry signal Car is high, the FF 12 is cleared. As a result, since the data selector 14 selects and outputs the signal at the input B, the initial value of the comparison data DB is "15".

When the recording of one scanning line is terminated, the recording scanning signal LINE1 becomes low and the counter 11 counts up. In the case where the counting value of the counter 11 varies as "0"→"1", "1"→"2", since the carry signal Car remains low, when the recording scanning signal LINE1 is changed to the low level and the MM 16 is triggered so that a short pulse signal is produced at its output terminal $Q_{16}$, this pulse signal $Q_{16}$ is given to the clear terminal CLR of the FF 12, which is therefore cleared. In the case where the counting value of the counter 11 varies as "2"→"3", the carry signal Car is changed to the high level and thus the pulse signal $Q_{16}$ generated by the MM 16 is given to the preset terminal PR of the FF 12, which is therefore preset Further, in the case where the counting value of the counter 11 is "3" and the carry signal Car is at the high level, since the load terminal L of the counter 11 is at the low level, the following counting value of the counter 11 is screen angle data SD. Consequently, when the screen angle data SD is "3", the FF 12 is preset and when it is not, the FF 12 is reset. This operation is continued as far as the recording is terminated and the printing signal PAGE becomes low.

Figure 5:
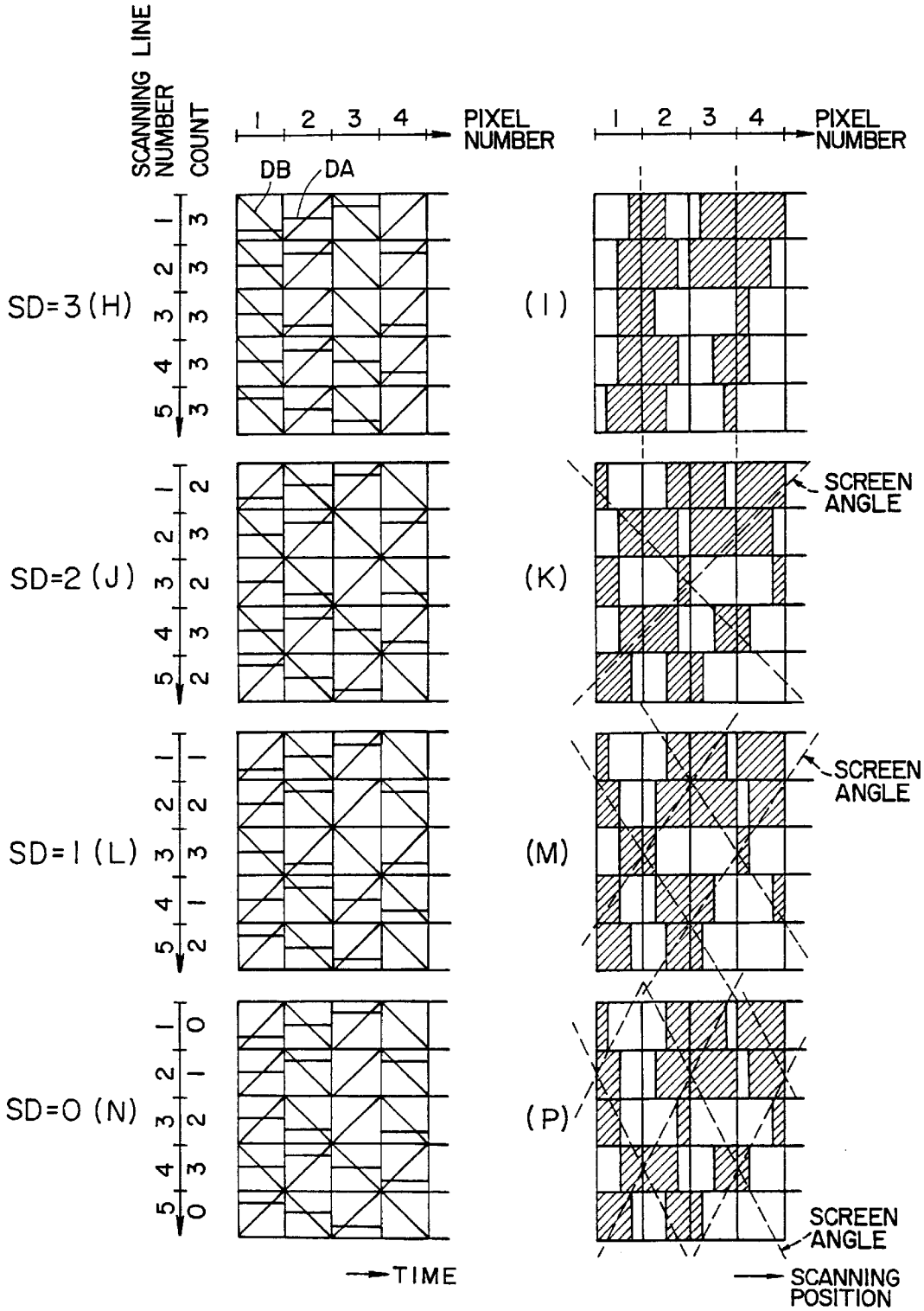
FIGS. 5(H)–(P) are schemes for explaining the working mode for production of the pixel recording pulse signal and the pixel recording pattern by means of the circuit indicated in FIG. 4.

FIGS. 5 (H)–(P) are timing charts showing the operation of production of the pixel recording pulse signal S controlled by this circuit and the pixel recording, in which (H) and (I) represent a case where the screen angle data SD are "3", (H) showing the operation of production of the pixel recording pulse signal, (I) illustrating a pixel recording pattern by means of the pixel recording pulse signal, which is obtained as the result of the operation indicated in (I). The abscissa corresponds to the recording scanning direction, where it represents the time in (H) and the scanning position in (I), but it is indicated here by the pixel number. The ordinate corresponds to the direction, along which the recording medium is sent, in which it represents the time in (H) and the transfer amount in (I), but it is indicated here by the scanning line number. Further, for the ordinate, the counting value of the counter 11 is written together therewith. (J) and (K) show the case where the screen angle data SD are "2"; (L) and (M) the case where the screen angle data SD are "1"; and (N) and (O) the case where the screen angle data SD are "0".

In the case where the screen angle data SD are "3", since the counting value of the counter 11 is always "3" as indicated in FIG. 5 (H) and thus the carry signal Car of the counter 11 is always at the high level, the FF 12 is preset every time the level of the recording scanning signal LINE1 becomes low. Consequently the initial value of the comparison data DB for every scanning line is "15" and the same operation of production of the pixel recording pulse signal as indicated in FIG. 1(F) is repeated. As a result the pixel recording pattern for each of the scanning lines based on the pixel recording pulse signal thus obtained is such that the pixels of pixel numbers 1 and 2, and 3 and 4 are continuous, as indicated in FIG. 5(I).

In the case where the screen angle data SD are "2", since the counting value of the counter 11 varies in the order of the scanning line number "2", "3", "2", "3", . . . , as indicated in FIG. 5(J), the carry signal Car of the counter 11 repeats to be at the low and high levels alternately and therefore the initial value of the FF 12 for each of the scanning lines is alternately "clear", "preset", "clear", . . . in the order of the scanning line number. Consequently the initial value of the comparison data DB for each of the scanning lines is "0", when the scanning line number is odd, and "15", when the scanning line number is even. As a result the same operations of production of the pixel recording pulse signal as indicated in FIGS. 1 (D) and (F), respectively, are alternately repeated. Consequently, for the scanning line having an odd number, as indicated in FIG. 5(K), pixels of pixel numbers 2 and 3, 4 and 5 form pairs and their pixel recording is continuous. To the contrary, for the scanning line having an even number, the pixel recording of the pixels number 1 and 2, 3 and 4 is continuous.

In the case where the screen angle data SD are "1", the counting value of the counter 11 repeats a same pattern as "1", "2", "3", "1", "2", "3", . . . , as indicated in FIG. 5(L). Consequently, since the initial value of the comparison data DB for each of the scanning lines repeats "0", "0", "15", . . . in the order of the scanning line number, the pixel recording pattern is such that it is indicated in FIG. 5(M).

In the case where the screen angle data SD are "0", the counting value of the counter 11 is represented by a repetition of "0", "1", "2", "3". Consequently, since the initial value of the comparison data DB repeats "0", "0", "0", "15", . . . in the order of the scanning line number, the pixel recording pattern is such that it is indicated in FIG. 5(P).

Comparing the pixel recording patterns indicated in FIGS. 5 (I), (K), (M) and (P), it can be understood that the screen angle of the recording pattern varies depending on the value of the screen angle data SD. In a full color laser beam printer by multiple printing when the screen angles of different colors are identical, Moire fringes are produced and the image quality is lowered. Consequently, in the case of such a color printing, it is possible to obtain a high quality color image without Moire fringe by varying the value of the screen angle data SD for every color.

In the embodiment described above, increase or decrease in the number of bits in the pixel tone data DA, the comparison data DB and the screen angle data SD, modifications in the waveform of the comparison data DB, e.g. modification into a form permitting to compensate γ characteristics of the printer, and further modifications of the method, by which the value of the screen angle data SD is set, are freely chosen.

It is obvious that this invention can be applied not only to the laser beam printer, but also other scanning recording type printing recording devices mentioned previously.

As explained above, according to this invention, since, in a pixel recording pulse signal generation method, by which tone data DA of each of pixels in an image signal are transformed into an image recording pulse signal having a time width proportional to the tone for each of the pixels and production of recording energy is controlled so as to be interrupted by the image recording pulse signal, the recording pulse signal is so produced that the rear or second end of the recording pulse signal of a preceding recording side pixel in a pair of pixels adjacent to an arbitrarily selected pixel in the recording scanning direction, is in accordance with the rear or second end of the arbitrarily selected pixel and the front or first end of the recording pulse signal of the succeeding recording side pixel is in accordance with the front or first end of the arbitrarily selected pixel, production of recording energy is continuous between the pixels of these pairs. In other words, the ratio of the areas of the unstable regions stated above can be reduced so that the factor lowering the image quality produced by interruptions of the recording energy and thus lowering of the image quality are alleviated.

Figure 3:
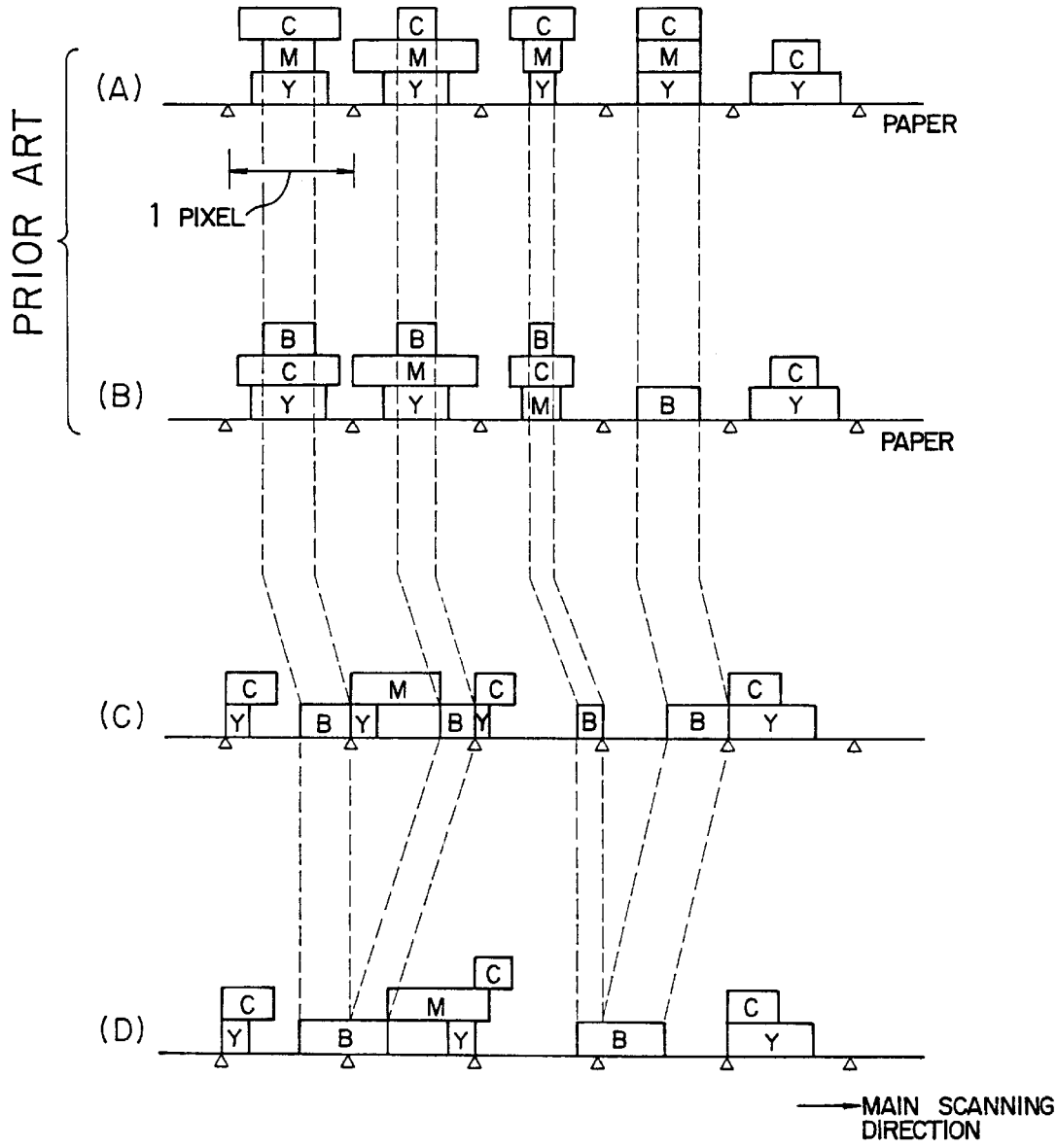
FIGS. 3(C) and (D) are schemes for explaining the principle of this invention in color printing, and FIGS. 3(A) and (B) are corresponding schemes for explaining the prior art techniques.

FIGS. 3 (C) and (D) are schemes illustrating the principle of 100% UCR according to this invention.

FIG. 3(A) indicates a cross-sectional view of a structure, where yellow ink Y, magenta ink M and cyan ink C are printed in this order on a white paper sheet concentrically at a dot so that they are superposed on each other. A Δ sign in FIG. 3 indicates a boundary between two adjacent pixels. FIG. 3(B) indicates the same structure, for which 100% UCR is effected according to the concentric solution model. As indicated in the figure, all the parts, where the three colors, yellow, magenta and cyan are superposed on each other so as to represent black points, are replaced by dots formed by black ink. Consequently, in the case where the dots of the three colors have the same size as the fourth pixel from the left, since they can be represented only by black dots, there is no color shear in printing due to superposition of different colored inks and further the amount of used colored inks is relatively small.

FIG. 3(C) illustrates an example, in which 100% UCR is effected according to this invention. In this example, colored dots such as yellow, magenta, cyan, etc. are put to the left within the pixel and only black dots are put to the right. When dots are printed in this way, the black dots and colored ones are not superposed on each other by calculation of 100% UCR. Consequently there are no colored inks, which have been used in vain under a black dots in the concentric solution model and the number of colored inks superposed on each other at a dot is at most 2, what reduces transfer defectives.

Furthermore, when colored dots are put to the left side corresponding to one end or the first end of the pixel in the scanning direction for the first pixel (from the left), the black dot is put to the right side corresponding to the other end or the second end of the pixel in the scanning direction; to the contrary, for the second pixel adjacent to the first pixel, the black dot is put to the left side and the colored dots are put to the right and so forth, that is, the position of the colored dots and that of the black dot are replaced alternately for every pixel, as indicated in FIG. 3(D), dots in two pixels adjacent to each other can be put together.

When they are printed in this way, they become larger in appearance and thus the central portion of the dots can be used with a higher efficiency. Further, at the same time, in this manner, since printing becomes less sensitive to shear of different colors in printing, it is possible to realize a color reproduction with a high fidelity having no Moire fringes.

Figure 6:
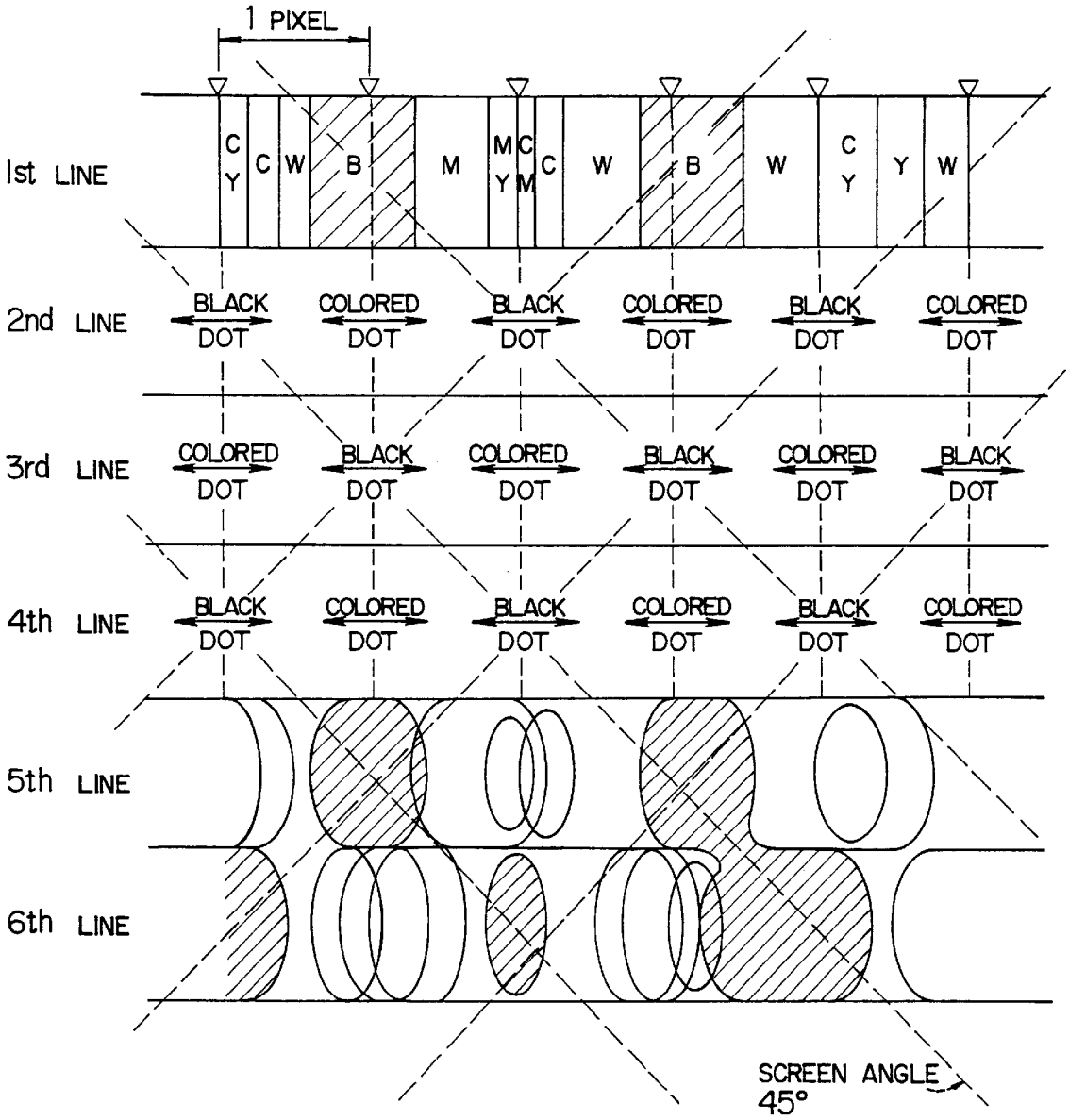
FIG. 6 shows graphs indicating more in detail the embodiment of this invention indicated in FIG. 3 (D)

FIG. 6 shows top views of the surface of the paper sheet for the embodiment of this invention indicated in FIG. 3(D). FIG. 3(D) is reproduced at the first line of FIG. 6.

The first pixel is divided from the left of the pixel into four parts, i.e. a part printed double with cyan ink and yellow ink, a part printed only with cyan ink, a blank part and a part printed only with black ink. Since the second pixel begins from the left by a black part, the black part of the first pixel and that of the second pixel are jointed together. On the whole it seems that black parts and colored parts are arranged alternately. When this procedure of arrangement is changed also for every line as indicated in the figure, the whole print is equivalent in appearance to a dot printing having a screen angle of 45°. The 5-th and 6-th lines in FIG. 6 illustrate a formation of dots, which is closer to the real image.

Figure 2:
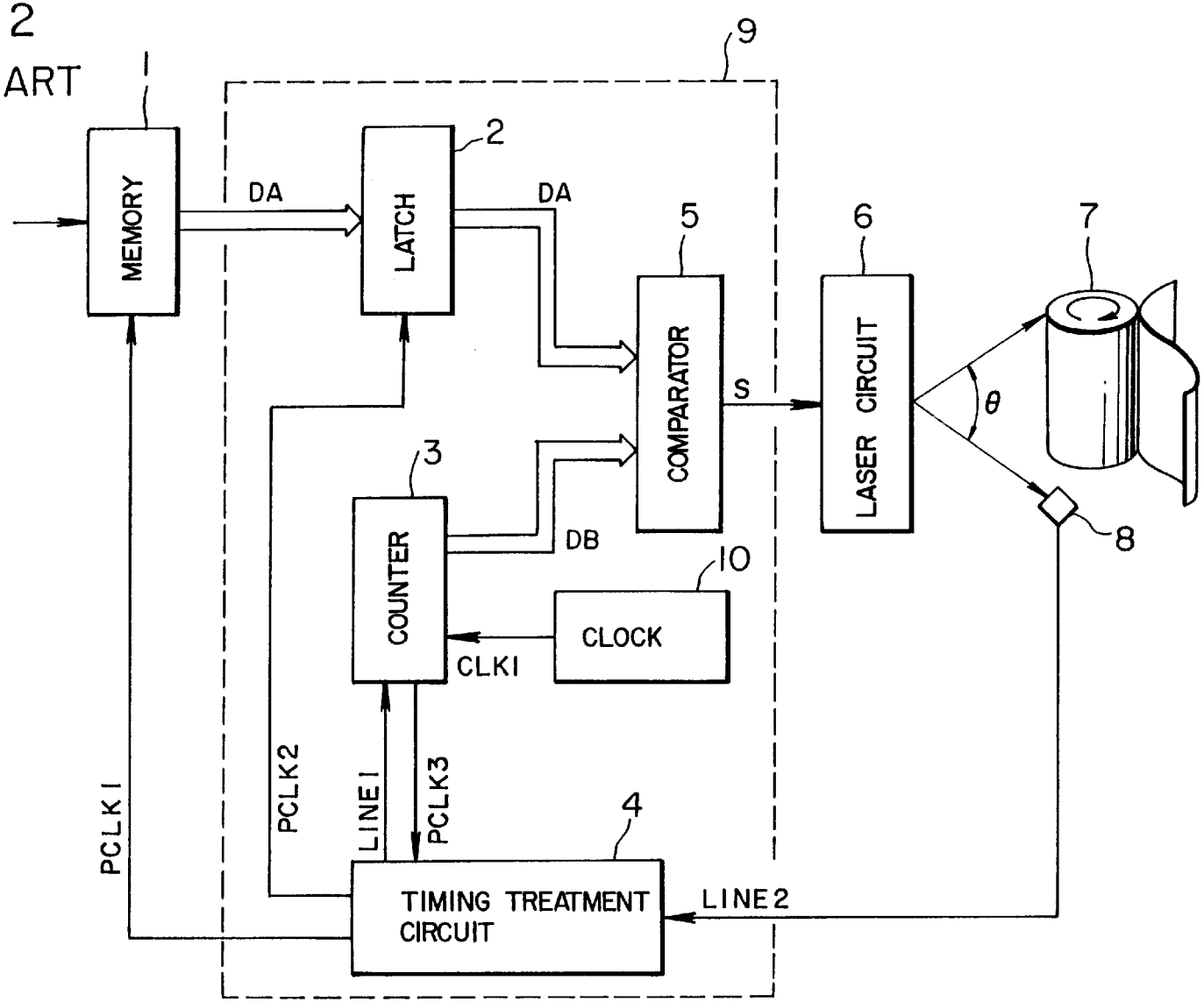
FIG. 2 PRIOR ART
FIG. 2 is a block diagram illustrating the construction of a prior art laser beam printer.
Figure 7:
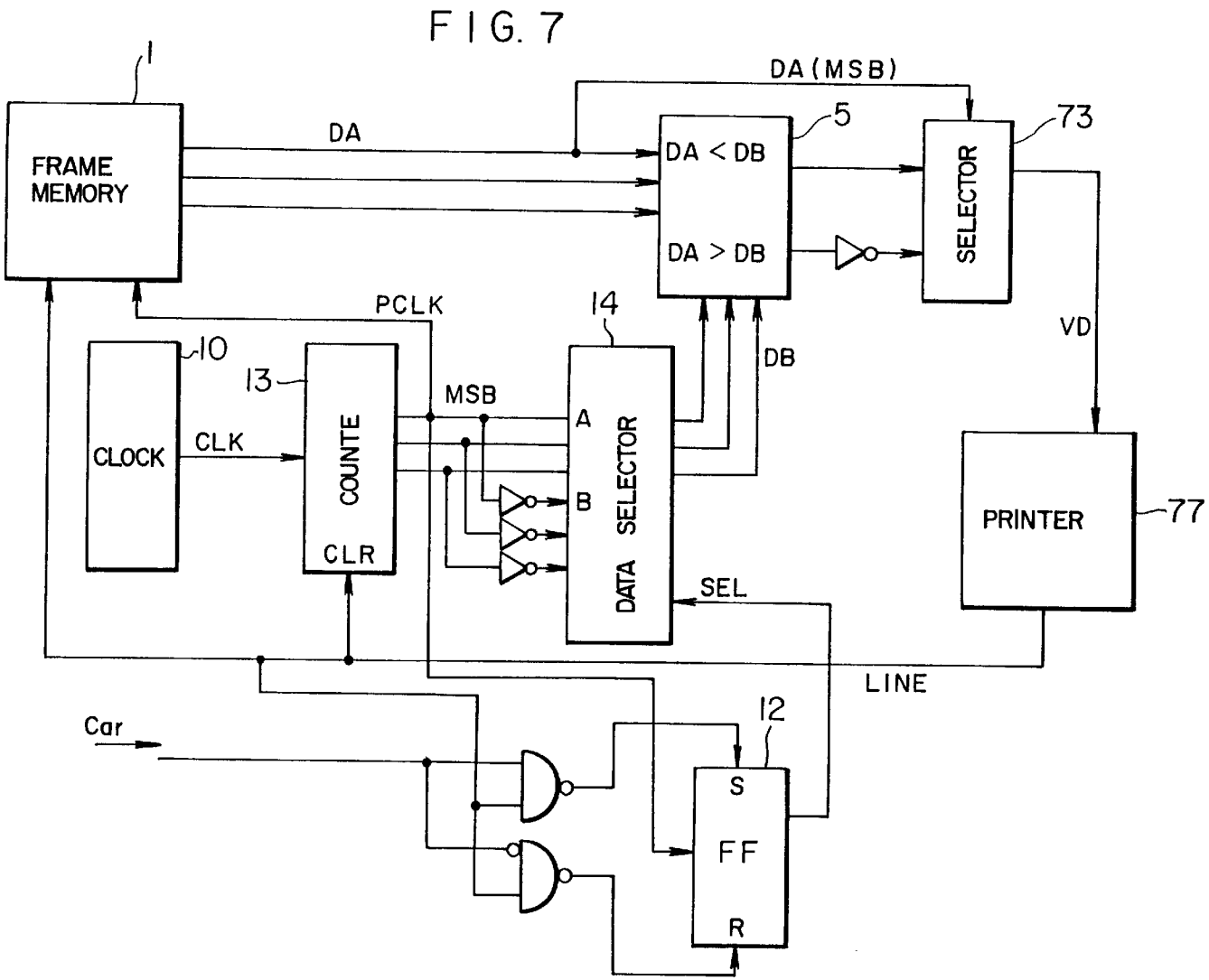
FIG. 7 is a block diagram indicating a circuit for obtaining the pixel recording pattern according to an embodiment of this invention.
Figure 8:
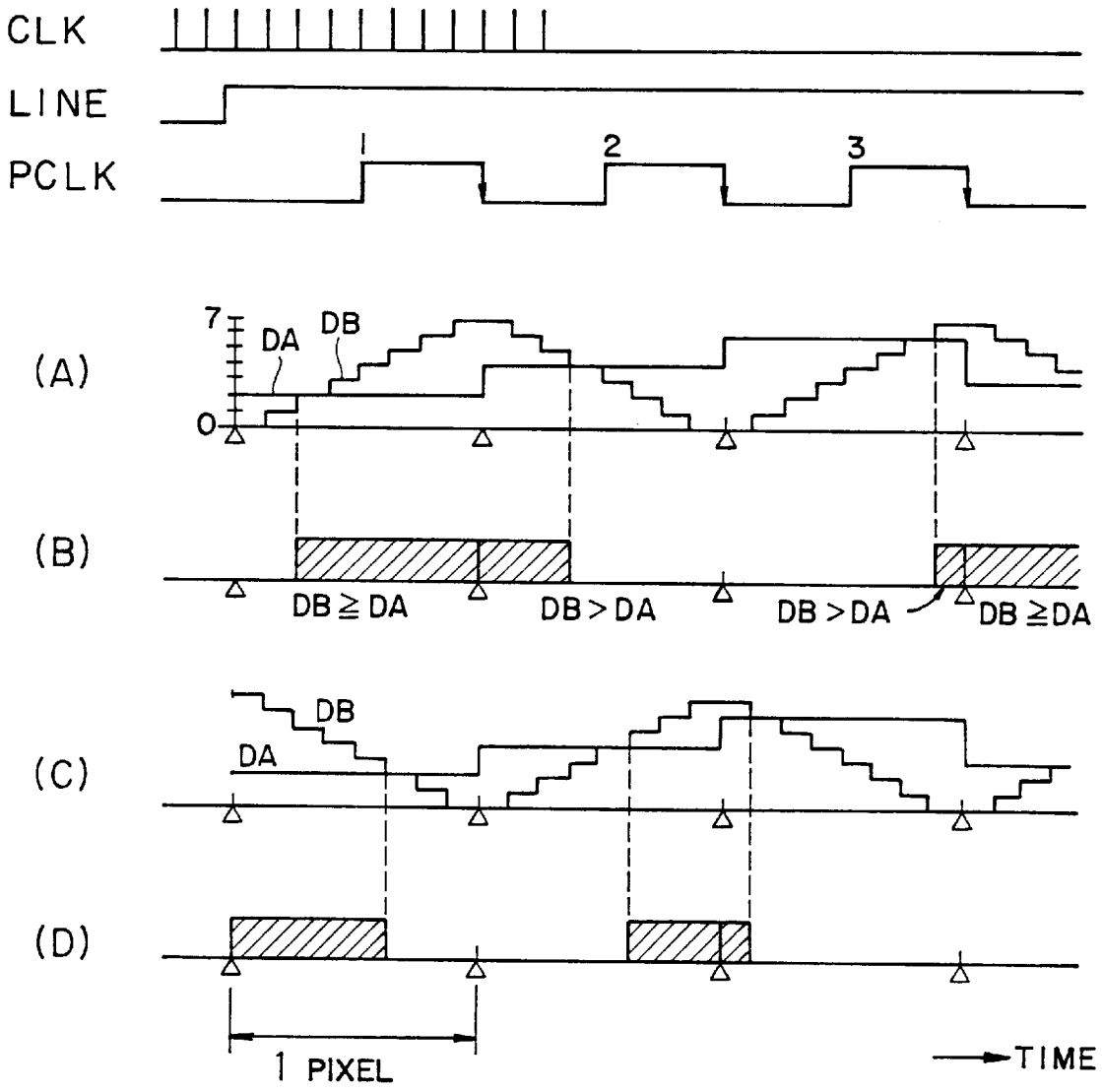
FIG. 8 shows graphs for explaining the working mode of the circuit indicated in FIG. 7.

FIG. 7 is a block diagram showing the construction of a circuit, for which the embodiment of this invention indicated in FIG. 3(D) to a digital printer scanned continuously in the horizontal direction as in a television and FIG. 8 shows schemes for explaining its working mode In FIG. 7 equivalent or identical items are represented by the same reference numerals as those used for the circuits indicated in FIGS. 2 and 4.

For explaining FIGS. 7 and 8 more concretely, the depth of the data DA allocated to each of the pixels of an image is represented by using e.g. a 3-bit number from "0" to "7". Consequently intermediate tones can be indicated by intermediate values among 8. An octal binary counter 13 and a pixel address counter of the frame memory 1, in which pixel data DA are stored, are cleared by the line synchronization signal LINE of a digital printer (e.g. laser beam printer, thermal head printer, ink jet printer, liquid crystal printer, semiconductor laser printer, light emitting diode printer) 77. At the same time the flip-flop (hereinbelow abbreviated to FF) 12 is set or preset depending on the phase data Car (cf. FIG. 4). The counter 13 counts the reference clock CLK coming from a clock oscillator 10 so that its output increases starting from "0". When the output of the FF 12 is low, the data selector 14 outputs the output of the counter 13 as it is as the comparison data DB, and when it is high, the data selector 14 outputs the reversed value of the output of the counter 13 as the comparison data DB. Consequently, when the output of the FF 12 is low, the comparison data DB increase from "0" to "7" and when it is high, the comparison data DB decreases from "7" to "0". When the content of the counter 13 has reached "7" and returned again to "0", the most significant bit MSB of the output of the counter 13 falls. Responding thereto, the memory 1 outputs the following pixel data and at the same time the FF 12 is reversed. Since the selector 14 reverses the comparison data by the reverse of the FF 12, as the result the comparison data DB begin with "0", when the phase data Car is "low", and increase and decrease between "0" and "7". Therefore, they are such that they are indicated in FIGS. 8(A) and (B). Further, when the phase data Car are "high" , they begin with "7" and decrease and increase between "0" and "7". Therefore, they are such that they are indicated in FIGS. 8 (C) and (D). On the other hand the pixel data DA outputted by the memory 1 are inputted in the comparator 5, where it is judged which are larger, the inputted pixel data DA or the comparison data DB. There are two judgement outputs of the comparator 5. One of them is "high", if DA<DB, and the other is "high", if DA>DB. Only the latter is reversed so as to be a signal representing DA≦DB and both the signals are inputted in a data selector 73. The most significant bit (MSB) of the pixel data DA is used as a selection signal in the selector 73, which outputs a signal, which is "high"if DA≦DB for the DA from "0" to "3", and if DA<DB for the DA from "4" to "7". When this signal is inputted in a printer 77, supposing that a black point is printed if the VD is high and a white point is printed if the VD is low, the area ratio S of the black part printed within one pixel varies as indicated in the following table and intermediate tone printing can be effected.

TABLE 1

| IMPUTTED DATA AND AREA RATIO S OF BLACK | | | |
|---|---|---|---|
| DA | S (%) | DA | S (%) |
| 0 | 0 | 4 | 62.5 |
| 1 | 12.5 | 5 | 75 |
| 2 | 25 | 6 | 87.5 |
| 3 | 37.5 | 7 | 100 |

In general, when area-modulation is effected by equally dividing the interior of a pixel into 2", (2"+1) different modulations are possible. Since image data are usually binary data, it is preferable to allocate the image data to 2" modulations. Since S=0(%) and 100(%) are necessary, the area-modulation is adapted to the image data in the circuit according to this invention at the sacrifice of S=50(%), which is at the middle point.

Then, when the phase data manipulated for every line or for every color, as indicated in Table 2, a printing indicated in FIG. 6 can be effected.

TABLE 2

| | PHASE DATA FD | | | | | |
|---|---|---|---|---|---|---|
| | Line | | | | | |
| Color | 1 | 2 | 3 | 4 | . . . | . . . |
| Yellow | H | L | H | L | . . . | . . . |
| Magenta | H | L | H | L | . . . | . . . |

TABLE 2-continued

| | PHASE DATA FD | | | | | |
|---|---|---|---|---|---|---|
| | Line | | | | | |
| Color | 1 | 2 | 3 | 4 | . . . | . . . |
| Cyan | H | L | H | L | . . . | . . . |
| Black | L | H | L | H | . . . | . . . |

H represents the high level
L represents the low level

This circuit needs no memory such as pattern generator, etc. and its construction is simple and fit for high speed operation. In addition, since the number of modulations of the area modulation is 2", as indicated in Table 1, it is easy to combine it with the multi-value Dither method or the multi-value depth pattern method.

Furthermore, although the position of the dots printed within a pixel has been shifted to the left or to the right (in the main scanning direction x), the same effects can be obtained, also when theY are shifted in the up-and-down direction (in the auxiliary direction y) or when they are shifted both in the left-and-right and up-and-down directions (in the main scanning direction x and the auxiliary scanning direction y). An embodiment in this case will be explained below, referring to FIGS. 9 to 11.

Figure 9:
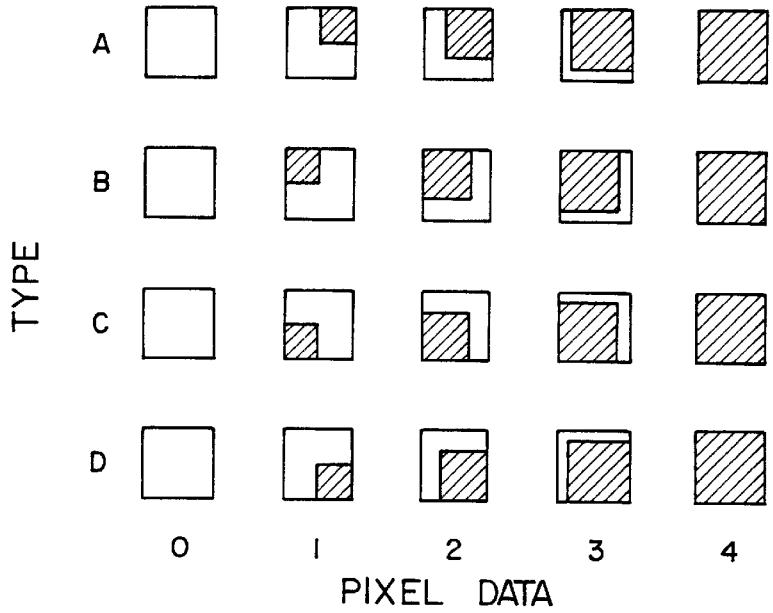
FIGS. 9–11 show embodiments in the case where the position of dots is controlled not only in the main scanning direction but also in the auxiliary scanning direction, indicating the position of dots, information given to the printer and the dot pattern recorded by printing, respectively.
Figure 10:
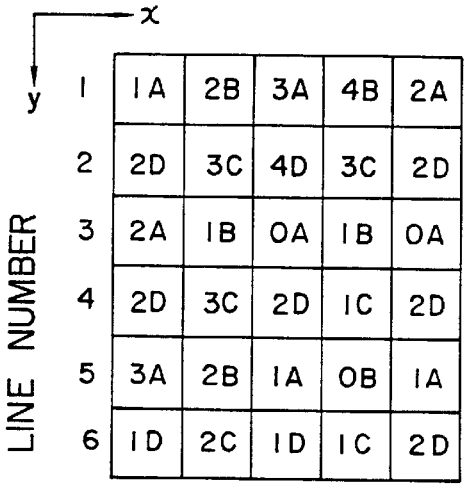
Figure 11:
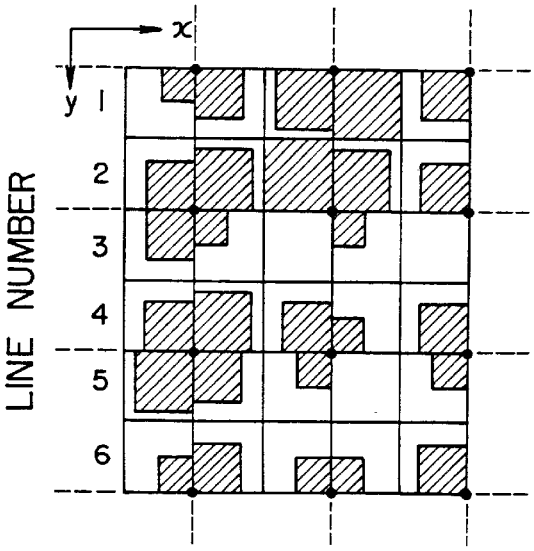

This invention can be applied to a case where a printer is used, which can control the position of dots area-modulated and printed within a pixel not only in the main scanning direction x but also in the auxiliary scanning direction y. FIG. 9 is a scheme for explaining how dots are arranged in pixels (not visible) allocated on the surface of a paper sheet Four types of dot positions, A, B, C and D, are conceivable on the basis of assumptions of a printer. In FIG. 9, there are five sorts of pixel data, i.e. from "0" to "4", which are tone data allocated to the pixels. "0" represents "white" and "4" "black (all over)". To the contrary "1"–"3" represent half tones between them. In the type A, the dot enlarges, starting from the upper right corner in the pixel, with increasing pixel data. In the types B, C and D the dot enlarges, starting from the upper left corner, the lower left corner and the lower the right corner of the pixel, respectively. Consequently, the printer receives the pixel data and information on the type, which are then recorded, as indicated in FIG. 9. FIG. 10 indicates information given to the printer for every pixel, in the case where the pixel data and the information thus received are recorded in practice, and FIG. 11 illustrates the recording result. The type information indicating the dot position within the pixel is given alternately for every pixel, such as A, B, A, B, . . ., for the first line, as indicated in FIG. 10, and alternately for every pixel, such as D, C, D, C, . . . for the second line. Further, on and after the third line, the type information for the first line and that for the second line are given alternately and repeatedly. Arbitrary information of "0"–"4" is allocated to each of the pixels, as the pixel data, and this figure shows an example thereof. The result obtained by recording on a paper sheet is such that it is indicated in FIG. 11, where four dots in four pixels, two adjacent pixels in the vertical direction and two adjacent pixels in the horizontal direction, are printed, as if they were gathered together at the center so as to be one point.

According to this embodiment, the number of dots is reduced to ¼ without lowering the resolving power between different pixels. That is, the ratio of area of the unstable region stated above is lowered and decreasing of the image quality is alleviated.

Figure 12:
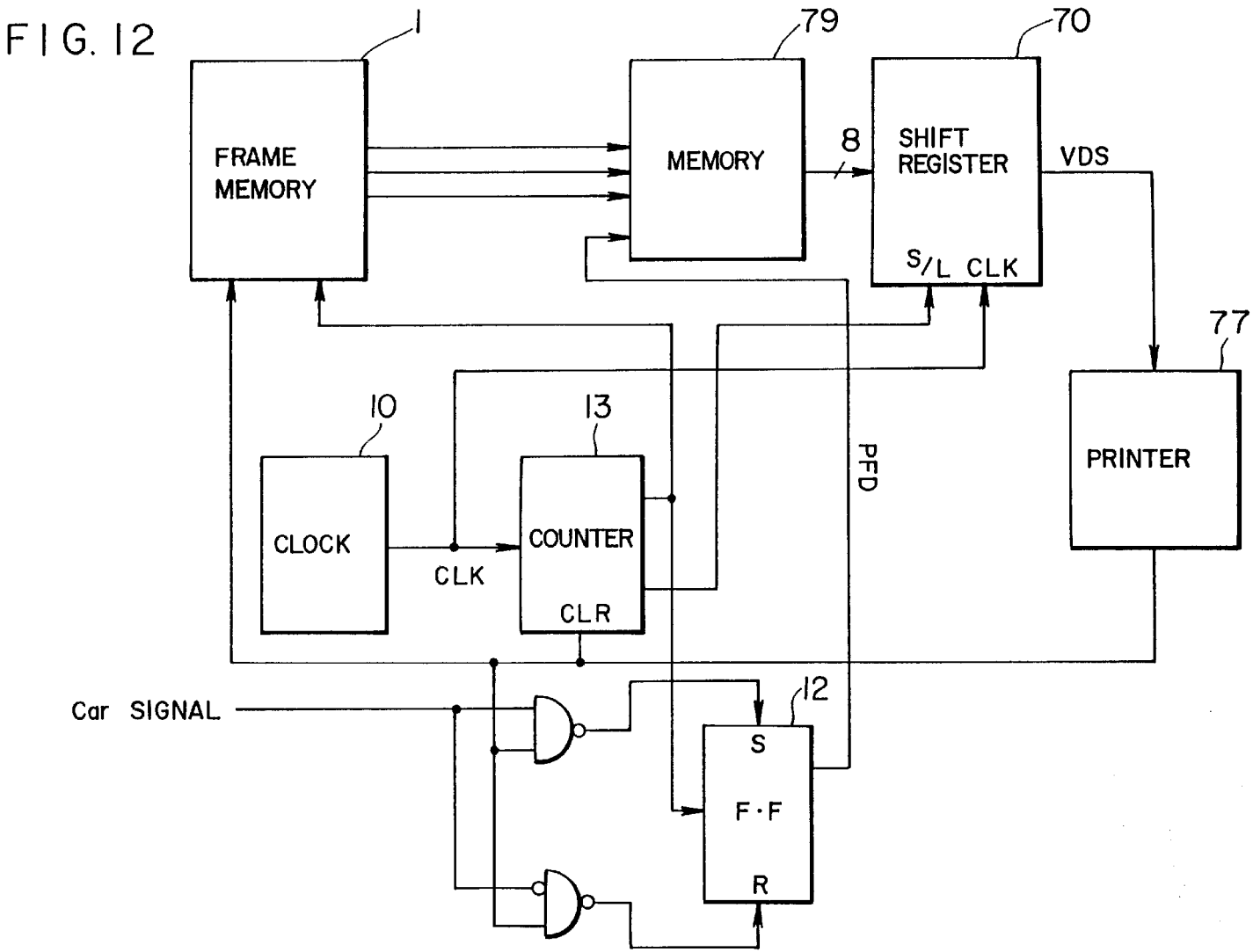
FIG. 12 is a block diagram indicating the construction of a circuit, which is another embodiment of this invention.

FIG. 12 is a block diagram illustrating the construction of still another apparatus for realizing the method according to this invention. The difference from the apparatus indicated in FIG. 7 consists in that the apparatus indicated in FIG. 12 is constructed by using a look up table memory 79 and a shift register 70 in place of the data selector 14 and comparator 5 indicated in FIG. 7. The memory 79 outputs an output pattern on the basis of the pixel data DA sent by the frame memory 1 and in-pixel phase data PFD sent by the flip-flop 12. The shift register 70 transforms it with a high speed by a parallel-serial transformation to form a video signal VDS. When the look up table is defined as follows, the apparatus works in the completely same manner as the apparatus indicated in FIG. 7.

TABLE 3

| DIGITAL VALUE (BINARY VALUE) OF PATTERN OUTPUTTED BY LOOK UP TABLE | | |
|---|---|---|
| PIXEL DATA | IN-PIXEL PHASE DATA PFD | |
| DA | "HIGH" | "LOW" |
| 0 | 0(00000000) | 0 (00000000) |
| 1 | 1(00000001) | 128 (10000000) |
| 2 | 3(00000011) | 192 (11000000) |
| 3 | 7(00000111) | 224 (11100000) |
| 4 | 31(00011111) | 248 (11111000) |
| 5 | 63(00111111) | 252 (11111100) |
| 6 | 127(01111111) | 254 (11111110) |
| 7 | 255(11111111) | 255 (11111111) |

The look up table memory 79 used in this embodiment receives image data of 12 bits in total, as shown in FIG. 13, from the frame memories $1_y$, $1_m$,$1_c$ and $1_b$ storing yellow, magenta, cyan and black data, respectively, and receives also selection signals $S_0$, $S_1$ for selecting necessary video signals and in-pixel phase data PFD, which can be expanded so that an optimum in-pixel net point arrangement can be calculated. In this case, since the position of the dot in each of the pixels can be set arbitrarily, applications as indicated below are conceivable.

Net point printing expresses, in general, colors by addition color mixing and subtraction color mixing and in general, their ratio cannot be determined unequivocally, even when the same color is expressed.

For example, in the case where red, having a reduced chromaticity is expressed, it can be obtained not by superposing two colors but by juxaposing them, as indicated in FIG. 14, where magenta is put in the left half and yellow is put in the right half of a pixel as shown at 100. However it can be obtained also by superposing the two colors, magenta and yellow, in the left half region as shown at 200. The former represents an addition color mixing of magenta and yellow and the latter represents a subtraction color mixing of magenta and yellow. Of course an intermediate color mixing between them can be conceived. According to the method of this invention it is possible to vary arbitrarily the ratio of these addition color mixing and subtraction color mixing. Either the subtraction color mixing or the addition color mixing can be determined, depending on the inks used. Therefore, by manipulating suitably this ratio of the subtraction color mixing and the addition color mixing by means of this apparatus, it is possible for the ink colors to be clearly displayed and therefore a wide spread color display can be obtained.

As explained above, according to this invention, since the position of the dot of every color printed within a pixel can be shifted up and down or left and right, it is possible to superpose inks ideally. Consequently stable dots can be formed and at the same time inks are used more usefully and resourcefully. Furthermore, by unifying reasonably net points (dots) of a same color, printing becomes stronger against shear, and as a result, this invention has an effect that the image quality is ameliorated in the reproduction of fill color images.

We claim:

[1. In a pixel recording pulse signal generation method in which tone data signals representing respective pixels of an image are transformed into respective pixel recording pulse signals each having a time width proportional to the value of the respective tone data signal, and in which said pixel recording pulse signals are used to print respective dots in respective pixels along scanning lines to reproduce said image, wherein only one dot is printed in each pixel of the reproduced image, the improvement wherein the pixels along each scanning line of the reproduced image are divided into pairs of adjacent pixels each pair consisting of a first pixel and a second pixel which succeeds the first pixel, and wherein the end of the pixel recording pulse signal corresponding to the first pixel is made to coincide with the beginning of the pixel recording pulse signal corresponding to the second pixel, thus causing the dots printed in the first and second pixels to be contiguous over the boundary between the first and second pixels.]

2. A color recording method in which colors are recorded by effecting area-modulation of areas within each of a plurality of pixels of a recorded image by arranging colored inks of at least two colors within the pixels, comprising the steps of:

effecting a first area-modulation of areas within said pixels by arranging a colored ink of at least a first color at first positions within said pixels; and effecting a second area-modulation of areas within said pixels by arranging a colored ink of at least a second color at second positions within said pixels;

wherein said colored ink of at least a first color is arranged from first ends of said pixels towards the centers of said pixels, and said colored ink of at least a second color is arranged from second ends of said pixels towards the centers of said pixels.

3. A color recording method according to claim 2, wherein said first area-modulation is effected by arranging one or more of yellow, magenta and cyan inks in an overlapping manner at said first positions, and wherein said second area-modulation is effected by arranging black ink at said second positions, the first and second area-modulations causing one color to be recorded per pixel.

[4. A scanning recording type printing device comprising:

memory means for storing tone data signals for a scanning line;

means including a clock generator and a counter for producing a comparison data signal formed by repeating an up counting operation and a down counting operation for each of a plurality of pairs of pixels of an image to be recorded;

means for comparing said stored tone data signals with said comparison data signal and for generating a pixel recording pulse signal based on the comparison; a semiconductor laser circuit for producing laser light based on said pixel recording pulse signal;

means for recording an image corresponding to said pixel recording pulse signal on a recording medium by sweeping said laser light across said recording medium in a scanning direction to record a dot in each of said plurality of pixels; and timing treatment means for controlling said memory means, said comparison data signal production means, said pixel recording pulse signal production means and said image recording means such that no interruptions in the scanning, direction exist between dots in first ones of said plurality of pixels and dots in respective succeeding ones of said plurality of pixels thereby producing dots which are continuous in the scanning direction across the boundaries of said first and succeeding pixels, wherein each of said plurality of dots has a width in a direction perpendicular to the scanning direction that is constant and a length in the scanning direction that is proportional to a respective one of said tone-data-signals.]

5. A scanning recording type printing method in which an image is printed by printing a dot in each of a plurality of pixels of the printed image, wherein the length of each dot in a scanning direction is proportional to respective tone data sampled from an original image and the width of each dot in a direction perpendicular to the scanning direction is constant, and wherein each dot is formed by ink of at least one color, said method comprising the step of:

locating dots within selected pixels in a scanning line of the printed image such that the dots in the selected pixels are printed at second ends of the selected pixels, said second ends of said selected pixels being adjacent to first ends of respective succeeding pixels.

[6. A scanning type printing method according to claim 5, wherein said selected pixels in said scanning line comprise odd-numbered pixels in said scanning line and the succeeding pixels comprise even-numbered pixels in said scanning line.]

7. A scanning type printing method according to claim 5, wherein said selected pixels in said scanning line comprise even-numbered pixels in said scanning line and the succeeding pixels comprise odd-numbered pixels in said scanning line.

[8. A scanning recording type printing device comprising:

memory means for storing tone data signals for a scanning line;

means including a clock generator and a counter for producing a comparison data signal formed by repeating an up counting operation and a down counting operation for each of a plurality of pairs of pixels of an image to be recorded;

means for comparing said stored tone data signals and said comparison data signal and for generating a pixel recording pulse signal based on the comparison;

a semiconductor laser circuit for producing laser light based on said pixel recording pulse signal;

means for recording an image corresponding to said pixel recording pulse signal on a recording medium by sweeping said laser light across said recording medium in a scanning direction to record a tone dot in each of said plurality of pixels; and timing treatment means for controlling said memory means, said comparison data signal production means, said pixel recording pulse signal production means and said image record means such that tone dots within selected pixels in a scanning line of the recorded image are recorded at second ends of said selected pixels, said second ends of said selected pixels being adjacent to first ends of respective succeeding pixels, wherein said tone dots have a constant width in a direction perpendicular to the scanning direction and each tone dot has a length in the scanning direction that is proportional to a respective one of said tone data signals.]

[9. A scanning recording type printing device according to claim 8, wherein said selected pixels in said scanning line comprise even-numbered pixels in said scanning line and the succeeding pixels comprise the even-numbered pixels in said scanning line.]

[10. A scanning type recording type printing device according to claim 8, wherein said selected pixels in said scanning line comprise even-numbered pixels in said scanning line and the succeeding pixels comprise odd-numbered pixels in said scanning line.]

[11. A scanning recording type printing device according to claim 8, further comprising means for controlling a screen angle at which the tone dots are recorded by controlling said comparison data signal production means.]

[12. A scanning recording type printing method in which an image is printed by printing a dot in each of a plurality of pixels of the printed image, wherein the length of each dot in a scanning direction is proportional to respective tone data sampled from an original image and the width of each dot in a direction perpendicular to the scanning direction is constant, and wherein each dot is formed by ink of at least one color, said method comprising the steps of:

locating second ends of first pixels and second ends of dots in said first pixels in coincidence with each other, and locating first ends of respective second pixels succeeding said first pixels in a scanning line and first ends of dots in said second pixels in coincidence with each other such that no interruptions in the scanning direction exist between said dots in said first pixels and said dots in said second pixels, thereby causing the printed image to have one continuous dot per pair of pixels; or locating first ends of first pixels and first ends of dots in said first pixels in coincidence with each other and locating second ends of respective second pixels succeeding said first pixels in a scanning line and second ends of dots in said second pixels in coincidence with each other such that no interruptions in the scanning direction exist between white areas without said dots recorded within said first pixels and white areas without said dots recorded within said second pixels, thereby causing the printed image to have one continuous white area per pair of pixels.]

*13. A scanning recording type printing method according to claim 5, wherein each dot is comprised of at least two colors selected from magenta, cyan and yellow.*

*14. A scanning recording type printing method according to claim 5, further comprising the step of:*

*locating dots, each being formed by ink of at least one color, within said respective succeeding pixels in a scanning line of the printed image such that the dots in said respective succeeding pixels are printed at said first ends of said respective succeeding pixels,*

*wherein said ink of at least one color in each of said dots located in said selected pixels at said second ends includes at least two of a plurality of colored inks including yellow (Y), magenta (M), and cyan (C).*

*15. A scanning recording type printing method according to claim 14, wherein at least one of said dots located at second ends of each of said selected pixels and at least one of said dots located at first ends of each of said respective succeeding pixels are formed of the same colored ink.*

*16. A scanning recording type printing method according to claim 5, further comprising the steps of:*

*locating dots, each being formed by ink of at least one color, within said respective succeeding pixels in a scanning line of the printed image such that the dots in said respective succeeding pixels are printed at said first ends of said respective succeeding pixels,*

*wherein said image is printed by printing said dots formed of ink of at least one color at said second ends of said selected pixels and printing other dots formed of ink of colors other than said at least one color at said second ends of said selected pixels.*

*17. A scanning recording type printing method according to claim 16, wherein at least one of said dots located at second ends of each of said selected pixels and at least one of said dots located at first ends of each of said respective succeeding pixels are formed of the same colored ink.*

*18. A scanning recording type printing method according to claim 5, further comprising the step of:*

*locating other dots within said selected pixels in said scanning line of the printed image such that said other dots in said selected pixels are printed at said second ends of said selected pixels,*

*wherein said dots and said other dots located within each of said selected pixels are superposed one on another.*

*19. A scanning recording type printing method according to claim 14, wherein dots located within each of said selected pixels are superposed one on another.*

*20. A scanning recording type printing method according to claim 16, wherein dots located within each of said selected pixels are superposed one on another.*

*21. A scanning recording type printing method according to claim 18, wherein at least one of said dots located at second ends of each of said selected pixels is continuous to each of said respective succeeding pixels.*

*22. A scanning recording type printing method according to claim 19, wherein at least one of said dots located at second ends of each of said selected pixels is continuous to each of said respective succeeding pixels.*

*23. A scanning recording type printing method according to claim 20, wherein at least one of said dots located at second ends of each of said selected pixels is continuous to each of said respective succeeding pixels.*

*24. A scanning recording type printing method according to claim 5, wherein each of said dots are of a multi-layer structure.*

*25. A scanning recording type printing method according to claim 14, wherein each of said dots are of a multi-layer structure.*

*26. A scanning recording type printing method according to claim 16, wherein each of said dots are of a multi-layer structure.*

*27. A scanning recording type printing method according to claim 24, wherein at least one of said dots located at second ends of each of said selected pixels is continuous to each of said respective succeeding pixels.*

*28. A scanning recording type printing method according to claim 25, wherein at least one of said dots located at second ends of each of said selected pixels is continuous to each of said respective succeeding pixels.*

*29. A scanning recording type printing method according to claim 26, wherein at least one of said dots located at second ends of each of said selected pixels is continuous to each of said respective succeeding pixels.*

*30. A scanning recording type printing method according to claim 5, wherein screen angles of at least two inks of different colors which form said dots are identical.*

*31. A scanning recording type printing method according to claim 14, wherein screen angles of at least two inks of different colors which form said dots are identical.*

*32. A scanning recording type printing method according to claim 16, wherein screen angles of at least two inks of different colors which form said dots are identical.*

*33. A scanning recording type printing method according to claim 5, wherein screen angles of at least two inks of different colors which form said dots are different.*

*34. A scanning recording type printing method according to claim 16, wherein screen angles of at least two inks of different colors which form said data are different.*

*35. A scanning recording type printing method according to claim 16, wherein screen angles of at least two inks of different colors which form said dots are different.*

*36. A scanning recording type printing method according to claim 5, further comprising the steps of:*

*locating dots within said respective succeeding pixels in said scanning line of the printed image such that said dots in said respective succeeding pixels are printed at said first ends of said respective succeeding pixels; and*

*locating dots of different colors within further selected pixels in said scanning line of the printed image such that said dots of different colors in said further selected pixels are printed at said second ends of said further selected pixels,*

*wherein said dots of different colors located within each of said further selected pixels are continuous to succeeding pixels.*

*37. A scanning recording type printing method according to claim 14, further comprising the steps of:*

*locating dots within said respective succeeding pixels in said scanning line of the printed image such that said dots in said respective succeeding pixels are printed at said first ends of said respective succeeding pixels; and*

*locating dots of different colors within further selected pixels in said scanning line of the printed image such that said dots of different colors in said further selected pixels are printed at said second ends of said further selected pixels,*

*wherein said dots of different colors located within each of said further selected pixels are continuous to succeeding pixels.*

*38. A scanning recording type printing method according to claim 16, further comprising the steps of:*

*locating dots within said respective succeeding pixels in said scanning line of the printed image such that said dots in said respective succeeding pixels are printed at said first ends of said respective succeeding pixels; and*

*locating dots of different colors within further selected pixels in said scanning line of the printed image such that said dots of different colors in said further selected pixels are printed at said second ends of said further selected pixels,*

*wherein said dots of different colors located within each of said further selected pixels are continuous to succeeding pixels.*

*39. A scanning recording type printing method according to claim 5, further comprising the step of:*

*locating dots, each being formed by ink of at least one color, within said respective succeeding pixels in a scanning line of the printed image such that the dots in said respective succeeding pixels are printed at said first ends of said respective succeeding pixels,*

*wherein said ink of at least one color in each of said dots located in said selected pixels at said second ends includes at least two of a plurality of colored inks.*

*40. A scanning recording type printing method according to claim 39, wherein said at least two of a plurality of colored inks include yellow (Y), magenta (M), and cyan (C).*

*41. A scanning recording type printing method according to claim 39, wherein at least one of said dots located at second ends of each of said selected pixels and at least one of said dots located at first ends of each of said respective succeeding pixels are formed of the same colored ink.*

*42. A scanning recording type printing method according to claim 39, wherein dots located within each of said selected pixels are superposed one on another.*

*43. A scanning recording type printing method according to claim 42, wherein at least one of said dots located at second ends of each of said selected pixels is continuous to each of said respective succeeding pixels.*

*44. A scanning recording type printing method according to claim 39, wherein each of said dots are of a multi-layer structure.*

*45. A scanning recording type printing method according to claim 44, wherein at least one of said dots located at second ends of each of said selected pixels is continuous to each of said respective succeeding pixels.*

*46. A scanning recording type printing method according to claim 39, wherein screen angles of at least two inks of different colors which form said dots are identical.*

*47. A scanning recording type printing method according to claim 39, wherein screen angles of at least two inks of different colors which form said data are different.*

*48. A scanning recording type printing method according to claim 39, further comprising the steps of:*

*locating dots within said respective succeeding pixels in said scanning line of the printed image such that said dots in said respective succeeding pixels are printed at said first ends of said respective succeeding pixels; and*

*locating dots of different colors within further selected pixels in said scanning line of the printed image such that said dots of different colors in said further selected pixels are printed at said second ends of said further selected pixels,*

*wherein said dots of different colors located within each of said further selected pixels are continuous to succeeding pixels.*

* * * * *